United States Patent
Hayashi et al.

(10) Patent No.: US 10,752,788 B2
(45) Date of Patent: *Aug. 25, 2020

(54) ANTIFOULING FILM

(71) Applicant: SHARP KABUSHIKI KAISHA, Sakai, Osaka (JP)

(72) Inventors: Hidekazu Hayashi, Sakai (JP); Atsushi Niinoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/069,299

(22) PCT Filed: Jul. 3, 2017

(86) PCT No.: PCT/JP2017/024370
§ 371 (c)(1),
(2) Date: Jul. 11, 2018

(87) PCT Pub. No.: WO2018/012340
PCT Pub. Date: Jan. 18, 2018

(65) Prior Publication Data
US 2019/0016900 A1    Jan. 17, 2019

(30) Foreign Application Priority Data

Jul. 12, 2016    (JP) ................................. 2016-137924

(51) Int. Cl.
*C09D 5/16* (2006.01)
*B32B 5/14* (2006.01)
(Continued)

(52) U.S. Cl.
CPC .............. *C09D 5/1637* (2013.01); *B32B 3/30* (2013.01); *B32B 5/14* (2013.01); *B32B 27/16* (2013.01);
(Continued)

(58) Field of Classification Search
CPC ...... C09D 5/1637; C09D 5/18; C09D 5/1662; C09D 7/65; B32B 27/18; B32B 27/16;
(Continued)

(56) References Cited

U.S. PATENT DOCUMENTS

2013/0049255 A1    2/2013    Matsumoto et al.
2017/0066207 A1    3/2017    Hayashi et al.
(Continued)

FOREIGN PATENT DOCUMENTS

JP    2003-172808 A    6/2003
JP    2005-097391 A    4/2005
(Continued)

*Primary Examiner* — Michael Zhang
(74) *Attorney, Agent, or Firm* — ScienBiziP, P.C.

(57) ABSTRACT

The antifouling film includes a polymer layer that includes on a surface thereof an uneven structure provided with multiple projections at a pitch not longer than a wavelength of visible light. The polymer layer has a proportion of the number of fluorine atoms relative to the sum of the numbers of carbon atoms, nitrogen atoms, oxygen atoms, and fluorine atoms of 33 atom % or more on the surface of the uneven structure and of 3 atom % or less on average in a region 90 to 120 nm deep from the surface of the uneven structure. The polymer layer has a proportion of the number of nitrogen atoms relative to the sum of the numbers of carbon atoms, nitrogen atoms, oxygen atoms, and fluorine atoms of 4 atom % or less on average in a region 90 to 120 nm deep from the surface of the uneven structure.

19 Claims, 9 Drawing Sheets

(51) Int. Cl.
- *B32B 27/16* (2006.01)
- *B32B 27/18* (2006.01)
- *B32B 3/30* (2006.01)
- *C09D 7/65* (2018.01)
- *C08J 5/18* (2006.01)
- *C08J 7/18* (2006.01)
- *B05D 5/08* (2006.01)
- *B05D 1/40* (2006.01)
- *B05D 3/06* (2006.01)

(52) U.S. Cl.
CPC ............... *B32B 27/18* (2013.01); *C08J 5/18* (2013.01); *C08J 7/18* (2013.01); *C09D 5/1662* (2013.01); *C09D 7/65* (2018.01); *B05D 1/40* (2013.01); *B05D 3/067* (2013.01); *B05D 5/083* (2013.01)

(58) Field of Classification Search
CPC ... B32B 5/14; C08J 7/18; B05D 3/067; B05D 1/40; B05D 5/083
See application file for complete search history.

(56) References Cited

U.S. PATENT DOCUMENTS

| | | | |
|---|---|---|---|
| 2017/0320281 A1 | 11/2017 | Hayashi et al. | |
| 2019/0001612 A1* | 1/2019 | Hayashi | B32B 3/30 |

FOREIGN PATENT DOCUMENTS

| | | | |
|---|---|---|---|
| JP | 2007-178724 A | 7/2007 | |
| JP | 2013-257373 A | 12/2013 | |
| JP | 2014-153524 A | 8/2014 | |
| JP | 2015-223725 A | 12/2015 | |
| JP | 2016-112869 A | 6/2016 | |
| JP | 5951165 B1 | 7/2016 | |
| WO | 2011/111741 A1 | 9/2011 | |
| WO | 2013/191089 A1 | 12/2013 | |
| WO | 2017/022701 A1 | 2/2017 | |
| WO | 2017/104520 A1 | 6/2017 | |

* cited by examiner (a)

(b)

(c)

(d)

(e)

ANTIFOULING FILM

TECHNICAL FIELD

The present invention relates to antifouling films. The present invention more specifically relates to an antifouling film including on a surface thereof an uneven structure of nanometer scale.

BACKGROUND ART

Optical films having an uneven structure of nanometer scale (nanostructure) are known for their excellent antireflective properties. This uneven structure has a continuously varying refractive index from the air layer to the substrate, thereby capable of reducing the reflected light significantly.

Although such optical films have excellent antireflective properties, the uneven structure on the surface may cause easy spread of dirt such as fingerprints (sebaceous dirt) sticking thereon and may further cause difficulty in wiping off such dirt present between projections. Such sticking dirt has a reflectance that is very different from the reflectance of the optical film, and thus is noticeable. This strongly increases demand for optical films having excellent antifouling properties as well as water repellency and oil repellency. For example, Patent Literatures 1 to 3 propose structures in which a layer of a fluorine-based material is formed on the surface of the uneven structure or a fluorine-based material is added to the uneven structure.

CITATION LIST

Patent Literature

Patent Literature 1: JP 2003-172808 A
Patent Literature 2: JP 2007-178724 A
Patent Literature 3: JP 2014-153524 A

SUMMARY OF INVENTION

Technical Problem

The present inventors found that the proportion of the number of fluorine atoms on the surface of the nanostructure needs to be higher than a predetermined value in order to achieve excellent fouling properties in addition to excellent antireflective properties of the uneven structure of nanometer scale. As a result of further investigation, however, the present inventors found that such optical films having excellent fouling properties have a region where projections have lower strength in the film surface. Thus, the uneven structure is broken when, for example, dirt sticking to the film surface is wiped off, resulting in loss of the antireflective properties and the antifouling properties. Therefore, the films need to have improved rubbing resistance.

The present invention is devised in view of the above state of the art, and aims to provide an antifouling film having excellent antifouling properties and rubbing resistance.

Solution to Problem

In order to solve the above problems and to achieve the above object, one aspect of the present invention relates to an antifouling film including a polymer layer that includes on a surface thereof an uneven structure provided with multiple projections at a pitch not longer than a wavelength of visible light, the polymer layer containing carbon atoms, nitrogen atoms, oxygen atoms, and fluorine atoms as constituent atoms, the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure and of 3 atom % or less on average in a region 90 to 120 nm deep from the surface of the uneven structure, the polymer layer having a proportion of the number of the nitrogen atoms relative to the sum of the numbers of the carbon atoms, the nitrogen atoms, the oxygen atoms, and the fluorine atoms measured by X-ray photoelectron spectroscopy of 4 atom % or less on average in a region 90 to 120 nm deep from the surface of the uneven structure.

Advantageous Effects of Invention

The present invention can provide an antifouling film having excellent antifouling properties and rubbing resistance.

DESCRIPTION OF EMBODIMENTS

Hereinafter, the present invention is described in more detail based on an embodiment with reference to the drawings. The embodiment, however, is not intended to limit the scope of the present invention. The configurations of the embodiment may appropriately be combined or modified within the spirit of the present invention.

The antifouling film as used herein means a film that enables easy removal of dirt sticking to a surface.

Figure 1:
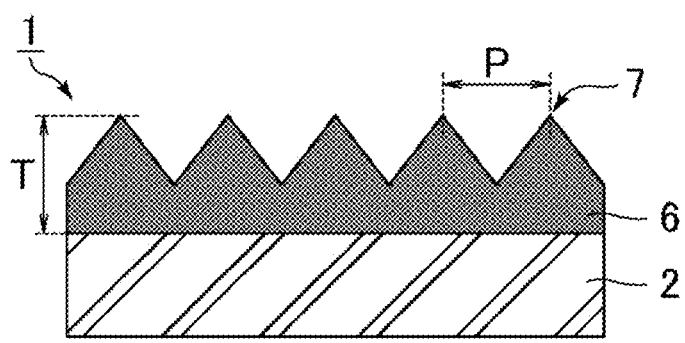
FIG. 1 is a schematic cross-sectional view of an antifouling film according to an embodiment.
Figure 2:
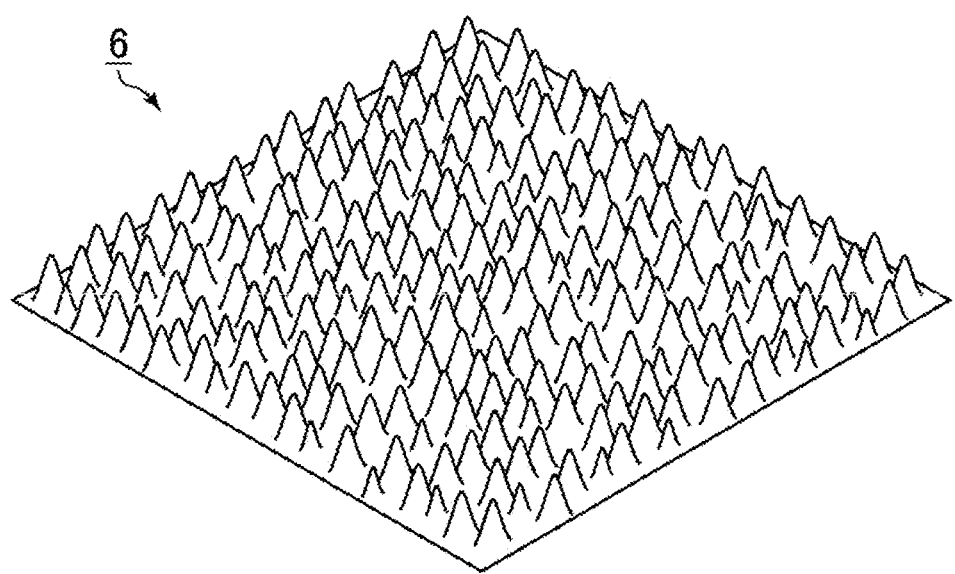
FIG. 2 is a schematic view of the surface provided with an uneven structure of the antifouling film according to the embodiment.

FIG. 1 is a schematic cross-sectional view of an antifouling film according to an embodiment. FIG. 2 is a schematic view of the surface provided with an uneven structure of the antifouling film according to the embodiment. As shown in FIGS. 1 and 2, the antifouling film according to the embodiment includes, on a substrate 2, a polymer layer 6 including an uneven structure on a surface thereof.

The material of the substrate 2 may be, for example, a resin such as triacetyl cellulose (TAC), polyethylene terephthalate (PET), or methyl methacrylate (MMA). The substrate 2 may appropriately further contain an additive such as a plasticizer in addition to the above material. One surface (the surface close to the polymer layer 6) of the substrate 2 may have undergone easy adhesion treatment. For example, a triacetyl cellulose film with easy adhesion treatment may be used. One surface (the surface close to the polymer layer 6) of the substrate 2 may have undergone saponification treatment. For example, a saponified triacetyl cellulose film may be used. When the antifouling film is attached to a display device provided with a polarizing plate such as a liquid crystal display device, the substrate 2 may constitute part of the polarizing plate.

The substrate 2 may have any thickness. In order to ensure the transparency and processability, the thickness is preferably 50 µm or greater and 100 µm or smaller.

The uneven structure disposed on the surface (the surface opposite to the substrate 2) of the polymer layer 6 corresponds to a structure on which multiple projections (protrusions) 7 are disposed with a pitch (distance between the apexes of adjacent projections 7) P not longer than the wavelength of visible light, i.e., a moth-eye structure (a structure like a moth's eye). Thus, an antifouling film 1 can exert excellent antireflective properties (low reflectivity) owing to the moth-eye structure.

Examples of the shape of the projections 7 include those tapering toward the tip (a tapered shape) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 7 are inclined, but the bases may not be inclined but may be flat.

The pitch P between adjacent projections 7 may be any value that is not longer than the wavelength of visible light (780 nm). In order to sufficiently prevent occurrence of optical phenomena such as moiré and iridescence, the pitch P is preferably 100 nm or greater and 400 nm or smaller, more preferably 100 nm or greater and 200 nm or smaller.

Each projection 7 preferably has a height of 50 nm or greater and 600 nm or smaller, more preferably 100 nm or greater and 300 nm or smaller, in order to allow each projection 7 to also have a preferred aspect ratio to be mentioned later.

Each projection 7 preferably has an aspect ratio of 0.8 or greater and 1.5 or smaller. If the aspect ratio of each projection 7 is smaller than 0.8, the film may insufficiently prevent occurrence of optical phenomena such as moiré and iridescence, possibly failing to achieve good reflection characteristics. If the aspect ratio of each projection 7 is greater than 1.5, the processability of the moth-eye structure may be poor, sticking may occur, and transferring conditions in formation of the moth-eye structure may be poor (e.g., clogging of die, twining of the material). The aspect ratio of a projection as used herein means the ratio of the height of the projection of interest and the pitch between adjacent projections (height/pitch).

The projections 7 may be arranged either randomly or regularly. In order to sufficiently prevent occurrence of moiré, the projections 7 are preferably arranged randomly.

The polymer layer 6 contains carbon atoms, nitrogen atoms, oxygen atoms, and fluorine atoms as constituent atoms, and may be formed by any of the following Methods 1 to 3, for example.

Method 1

Figure 3:
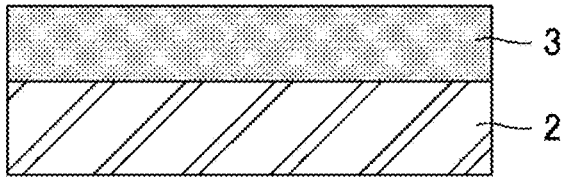
FIG. 3 includes schematic cross-sectional views illustrating Method 1 of producing the antifouling film according to the embodiment.
Figure 3:
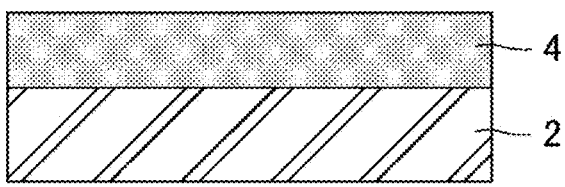
Figure 3:
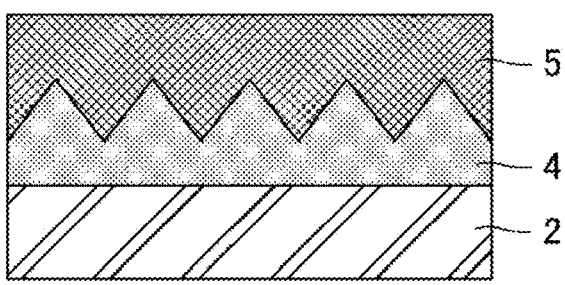
Figure 3:
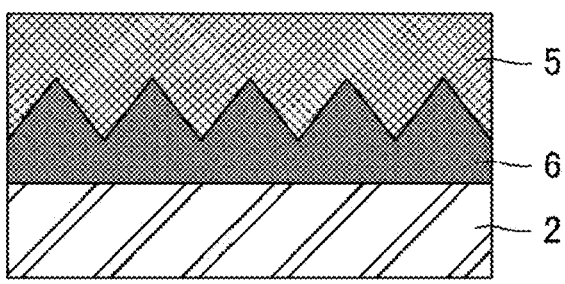
Figure 3:
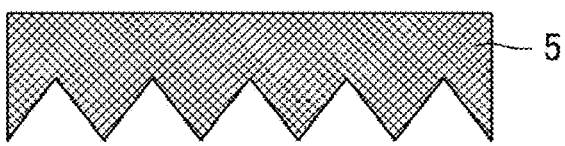
Figure 3:
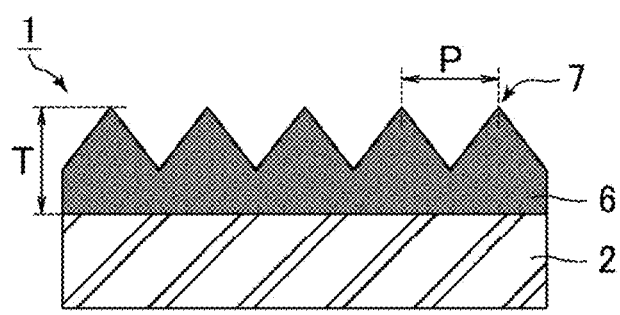

FIG. 3 includes schematic cross-sectional views illustrating Method 1 of producing the antifouling film according to the embodiment.

(Process (1): Preparation of Resin Solution)

A photo-curable resin and a release agent are mixed to provide a resin solution 3.

The resin solution 3 may be prepared by the following procedure, for example.

(i) Components such as various monomers and a photopolymerization initiator are mixed as appropriate to provide a photo-curable resin.

(ii) A mixture of the photo-curable resin and a release agent is prepared.

(iii) The mixture of the photo-curable resin and the release agent is dissolved in a solvent to provide the resin solution 3.

In the above procedure as a method of preparing the resin solution 3, the solvent is added after the photo-curable resin and the release agent are mixed with each other. Still, if the photo-curable resin and the release agent are sufficiently mixed with each other, no solvent may be added. Alternatively, the release agent may be added after the photo-curable resin and a solvent are mixed.

(Process (2): Application of Resin Solution)

As shown in FIG. 3(a), the resin solution 3 is applied to a surface of the substrate 2.

Examples of techniques of applying the resin solution 3 include spray coating, gravure coating, slot-die coating, and bar coating. In order to level the thickness of the film applied and to achieve good productivity, gravure coating or slot-die coating is preferred.

(Process (3): formation of resin layer)

In the case of adding a solvent to the resin solution 3, heat treatment is performed so as to remove the solvent from the resin solution 3 applied. As a result, the resin layer 4 is formed as shown in FIG. 3(b).

An example of the heat treatment is a method of heating the workpiece with the resin solution 3 applied to the surface of the substrate 2 (the state shown in FIG. 3(a)) in an oven. The heat treatment is preferably performed at a temperature not lower than the boiling point of the solvent. The solvent may be either partially or completely removed by the heat treatment.

(Process (4): Formation of Uneven Structure)

As shown in FIG. 3(c), the substrate 2 is pushed to a die 5 with the resin layer 4 in between. As a result, the uneven structure is formed on the surface (the surface opposite to the substrate 2) of the resin layer 4.

(Process (5): Curing of Resin Layer)

The resin layer 4 is cured by light irradiation. As a result, as shown in FIG. 3(d), the polymer layer 6 is formed.

Curing of the resin layer 4 is achieved by light irradiation, and is preferably performed by application of active energy rays. The active energy rays mean ultraviolet rays, visible light, infrared rays, plasma, or the like. The resin layer 4 is preferably one that is curable by ultraviolet rays. Light irradiation to the resin layer 4 may be performed from the substrate 2 side of the resin layer 4, or may be performed from the die 5 side of the resin layer 4. Light irradiation to the resin layer 4 may be performed once or may be performed multiple times. Curing of the resin layer 4 (Process (5)) may be performed simultaneously with the aforementioned formation of the uneven structure on the resin layer 4 (Process (4)).

(Process (6): release of die)

As shown in FIG. 3(e), the die 5 is released from the polymer layer 6. As a result, the antifouling film 1 is completed.

In order to allow the active component (fluorine-containing component) of the release agent to be distributed on the surface (the surface opposite to the substrate 2) of the polymer layer 6 at a high concentration, the polymer layer 6 preferably has a small thickness T. Specifically, the thickness T of the polymer layer 6 is preferably 5.0 μm or greater and 20.0 μm or smaller. As shown in FIG. 3(e), the thickness T of the polymer layer 6 means the distance from the surface close to the substrate 2 to the apex of a projection 7.

In the aforementioned production process, Processes (2) to (6) can be continuously and efficiently performed if the substrate 2 is in the form of a roll.

Next, the materials used in Method 1 are described below.

(Release Agent)

The release agent is preferably a fluororesin containing a photo-reactive group (hereinafter, also referred to simply as a fluororesin), i.e., a fluorine-based release agent. Fluororesins have a low surface free energy, and thus are preferred so as to improve the antifouling properties (e.g., ease of wiping off fingerprints).

The fluororesin contains as an active component a fluorine-containing monomer containing a photo-reactive group (hereinafter, also referred to simply as a fluorine-containing monomer). Such a fluororesin leads to a low surface free energy of the polymer layer 6, and thus can improve the antifouling properties. Further, fluorine atoms are distributed on the surface (the surface opposite to the substrate 2) of the polymer layer 6, and thus improve the smoothness. The photo-reactive group as used herein means a functional group reactive with another component in the presence of light. Examples of such a photo-reactive group include alkoxysilyl groups, silyl ether groups, silanol groups obtainable by hydrolysis of alkoxysilyl groups, a carboxy group, a hydroxy group, an epoxy group, a vinyl group, an allyl group, an acryloyl group, and a methacryloyl group. In order to achieve good photo-reactivity and handleability, the photo-reactive group is preferably an alkoxysilyl group, a silyl ether group, a silanol group, an epoxy group, a vinyl group, an allyl group, an acryloyl group, or a methacryloyl group, more preferably a vinyl group, an allyl group, an acryloyl group, or a methacryloyl group, still more preferably an acryloyl group or a methacryloyl group.

In addition to the photo-reactive group, the fluorine-containing monomer preferably contains a moiety containing at least one selected from the group consisting of fluoroalkyl groups, fluorooxyalkyl groups, fluoroalkenyl groups, fluoroalkanediyl groups, and fluorooxyalkanediyl groups. Fluoroalkyl groups, fluorooxyalkyl groups, fluoroalkenyl groups, fluoroalkanediyl groups, and fluorooxyalkanediyl groups are substituents in which at least one of the hydrogen atoms is replaced by a fluorine atom respectively in alkyl groups, oxyalkyl groups, alkenyl groups, alkanediyl groups, and oxyalkanediyl groups. Fluoroalkyl groups, fluorooxyalkyl groups, fluoroalkenyl groups, fluoroalkanediyl groups, and fluorooxyalkanediyl groups are substituents mainly containing fluorine atoms and carbon atoms. The structure of each group may have a branch, and multiple of these substituents may be linked with each other.

An example of the fluorine-containing monomer is one represented by the following formula (A):

$$R^{f1}\text{—}R^2\text{-}D^1 \qquad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is a photo-reactive group.

Examples of the fluorine-containing monomer represented by the formula (A) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

An example of a material of the fluorine-containing monomer is preferably a material having a fluoropolyether moiety. The fluoropolyether moiety is a moiety formed of a fluoroalkyl group, an oxyfluoroalkyl group, an oxyfluoroalkyldiyl group, or the like, and is a structure typified by the following formula (B) or (C):

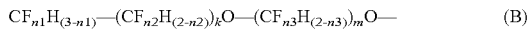

$$CF_{n1}H_{(3-n1)}\text{—}(CF_{n2}H_{(2-n2)})_k O\text{—}(CF_{n3}H_{(2-n3)})_m O\text{—} \qquad (B)$$

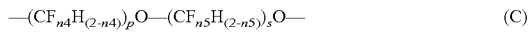

$$\text{—}(CF_{n4}H_{(2-n4)})_p O\text{—}(CF_{n5}H_{(2-n5)})_s O\text{—} \qquad (C)$$

wherein n1 is an integer of 1 to 3; n2 to n5 are each 1 or 2; and k, m, p, and s are each an integer of 0 or greater. A preferred combination of n1 to n5 is such that n1 is 2 or 3 and n2 to n5 are each 1 or 2. A more preferred combination is such that n1 is 3, n2 and n4 are 2, and n3 and n5 are 1 or 2.

The fluoropolyether moiety preferably has a carbon number of 4 or more and 12 or less, more preferably 4 or more and 10 or less, still more preferably 6 or more and 8 or less. If the carbon number is less than 4, the surface free energy may unfortunately be low. If the carbon number is more than 12, the solubility in a solvent may unfortunately be low. The fluorine-containing monomer may contain multiple fluoropolyether moieties per molecule.

Known examples of the fluorine-containing monomer include "Optool® DAC" (disclosed in WO2011/111741, [0053] to [0055]) and "Optool DAC-HP" from Daikin Industries, Ltd., "CHEMINOX® FAAC-6" (disclosed in JP 5541272 B) from Unimatec Corp., "Afluid" from Asahi Glass Co., Ltd., "Megaface® RS-76-NS" from DIC Corp., "Fomblin® MT70" from Solvay (disclosed in JP 2015-183082 A, [0055] to [0058]), "Megaface RS-75" from DIC Corp., "C10GACRY" from Yushiseihin Co., Ltd., and "C8HGOL" from Yushiseihin Co., Ltd. The fluorine-containing monomer is preferably one that is curable (polymerizable) by ultraviolet rays. The fluorine-containing monomer preferably contains one or both of the —$OCF_2$— chain and the =NCO— chain. The release agent may contain one or multiple of these fluorine-containing monomers.

In addition to the fluorine-containing monomer, the fluororesin may contain other components such as a fluorosurfactant and a reactive monomer.

Known examples of the fluorosurfactant include "Surflon®" from AGC Seimi Chemical Co., Ltd., "Ftergent® 650A" from Neos Co., Ltd., "FC-4430" from 3M, "FC-4432" from 3M, "EFTOP" from Mitsubishi Materials Electronic Chemicals Co., Ltd., and "Megaface R-43" from DIC Corp. The fluorosurfactant may be one that is curable (polymerizable) by ultraviolet rays. The fluorosurfactant preferably contains one or both of the —$OCF_2$— chain and the =NCO— chain. The release agent may contain one or multiple of these fluorosurfactants.

Examples of the reactive monomer include amide-containing monomers such as N-acryloylmorpholine, N-(2-hydroxyethyl) acrylamide, and N,N-diethylacrylamide; hydroxy-containing monomers such as 1,4-cyciohexanedimethanol monoacrylate and 4-hydroxybutyl acrylate; and acetacetoxy-containing monomers such as 2-acetacetoxyethyl methacrylate. A known example of N-acryloylmorpholine is "ACMO®" from KJ Chemicals Corp. A known example of N-(2-hydroxyethyl)acrylamide is "HEAA®" from KJ Chemicals Corp. A known example of N,N-diethylacrylamide is "DEAA®" from KJ Chemicals Corp. A known example of 1,4-cyclohexanedimethanol monoacrylate is "CHDMMA" from Nippon Kasei Chemical Co., Ltd. A known example of 4-hydroxybutyl acrylate is "4HBA" from Nippon Kasei Chemical Co., Ltd. A known example of 2-acetacetoxyethyl methacrylate is "AAEM" from Nippon Synthetic Chemical Industry Co., Ltd. The release agent may contain one or multiple of these reactive monomers. These reactive monomers preferably contain an acid amide bond in the molecule.

Instead of the aforementioned fluorine-based release agent (fluororesin), the release agent may be a silicone-based release agent or a phosphate-ester-based release agent, for example.

The silicone-based release agent may be a silicone diacrylate. A known example thereof is "EBECRYL® 350" from Daicel-Allnex Ltd.

The phosphate-ester-based release agent may be a (poly) oxyethylene alkyl phosphate ester. A known example thereof is "NIKKOL® TDP-2" from Nikko Chemicals Co., Ltd.

The resin layer 4 contains the active component of the release agent in an amount of preferably 0.1 wt % or more and 10 wt % or less, more preferably 0.5 wt % or more and 9 wt % or less, still more preferably 1 wt % or more and 5 wt % or less. If the active component content of the release agent in the resin layer 4 is less than 0.1 wt %, the amount of the active component of the release agent on the surface (the surface opposite to the substrate 2) of the polymer layer 6 may be too small, which may unfortunately cause poor antifouling properties. If the active component content of the release agent in the resin layer 4 is more than 10 wt %, the amount of the active component of the release agent on the surface (the surface opposite to the substrate 2) of the polymer layer 6 may be too large. This may unfortunately cause poor elasticity of the polymer layer 6 (projections 7), and projections 7 fallen by rubbing the surface (the surface opposite to the substrate 2) of the polymer layer 6 may fail to rise (restore) again. As a result, the rubbing resistance may be poor.

(Photo-Curable Resin)

The photo-curable resin contains components such as various monomers and a photo-polymerization initiator.

Examples of the various monomers include urethane acrylate, ethoxylated polyglycerin polyacrylate, and ethoxylated pentaerythritol tetraacrylate. A known example of the urethane acrylate is "U-10HA" from Shin Nakamura Chemical Co., Ltd. A known example of the ethoxylated polyglycerin polyacrylate is "NK ECONOMER® A-PG5027E" from Shin Nakamura Chemical Co., Ltd. A known example of the ethoxylated pentaerythritol tetraacrylate is "ATM-35E" from Shin Nakamura Chemical Co., Ltd. The photo-curable resin may contain one or multiple of these monomers.

The photo-polymerization initiator is active to light (active energy rays), and is added so as to initiate a polymerization reaction for polymerizing the monomers. Examples of the photo-polymerization initiator include radical polymerization initiators, anionic polymerization initiators, and cationic polymerization initiators. Examples of such a photo-polymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acylphosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. A known example of 2,4,6-trimethylbenzoyl-diphenyl-phosphine oxide is "IRGACURE® TPO" from BASF SE. A known example of bis(2,4,6-trimethylbenzoyl)-phenylphosphine oxide is "IRGACURE 819" from BASF SE. A known example of 1-hydroxy-cyclohexyl-phenyl-ketone is "IRGACURE 184" from BASF SE. The photo-curable resin may contain one or multiple of these photo-polymerization initiators.

The photo-curable resin preferably contains a compatible monomer that is compatible with the release agent. The presence of the compatible monomer allows the active component of the release agent to be easily uniformly distributed on the surface (the surface opposite to the substrate 2) of the polymer layer 6, possibly improving the antifouling properties. Further, the compatible monomer can improve the adhesion between the photo-curable resin and the release agent, possibly improving the rubbing resistance.

Examples of the compatible monomer include N-acryloylmorpholine (e.g., "ACMO" from KJ Chemicals Corp.), N,N-diethylacrylamide (e.g., "DEAA®" from KJ Chemicals Corp.), N,N-dimethylacrylamide (e.g., "DMAA®" from KJ Chemicals Corp.), tetrahydrofuran acrylate (e.g., "Viscoat

150" from Osaka Organic Chemical Industry Ltd.), cyclic trimethylolpropane formal acrylate (e.g., "Viscoat #200" from Osaka Organic Chemical Industry Ltd.), and 4-hydroxybutyl acrylate (e.g., "4HBA" from Nippon Kasei Chemical Co., Ltd.). The compatible monomer is preferably a monofunctional monomer containing a polar group such as an amide group, an ether group, or a hydroxy group. The photo-curable resin may contain one or multiple of these compatible monomers.

The photo-curable resin contains the compatible monomer in amount of preferably 5 wt % or more and 30 wt % or less, more preferably 10 wt % or more and 25 wt % or less, still more preferably 15 wt % or more and 25 wt % or less. If the compatible monomer content in the photo-curable resin is less than 5 wt %, the antifouling properties and the rubbing resistance may unfortunately be poor, especially in a high-temperature/high-humidity environment. If the compatible monomer content in the photo-curable resin is more than 30 wt %, the polymer layer 6 may have a low crosslinking density and a strong cohesive force between bonds, so that the polymer layer 6 may have high hardness. This may unfortunately cause poor rubbing resistance, especially in a high-temperature/high-humidity environment.

(Solvent)

The solvent may be any one that dissolves the photo-curable resin and the release agent. Examples thereof include alcohols (carbon number: 1 to 10, e.g., methanol, ethanol, n- or i-propanol, n-, sec-, or t-butanol, benzyl alcohol, and octanol), ketones (carbon number: 3 to 8, e.g., acetone, methyl ethyl ketone (MEK), methyl isobutyl ketone, diisobutyl ketone, dibutyl ketone, and cyclohexanone), esters or ether esters (carbon number: 4 to 10, e.g., ethyl acetate, butyl acetate, and ethyl lactate), γ-butyrolactone, ethylene glycol monomethyl acetate, propylene glycol monomethyl acetate, ethers (carbon number: 4 to 10, e.g., EG monomethyl ether (methyl cellosolve), EG monoethyl ether (ethyl cellosolve), diethylene glycol monobutyl ether (butyl cellosolve), and propylene glycol monomethyl ether), aromatic hydrocarbons (carbon number: 6 to 10, e.g., benzene, toluene, and xylene), amides (carbon number: 3 to 10, e.g., dimethylformamide, dimethylacetamide, and N-methylpyrrolidone), halogenated hydrocarbons (carbon number: 1 or 2, e.g., methylene dichloride and ethylene dichloride), and petroleum-based solvents (e.g., petroleum ether and petroleum naphtha). The resin solution may contain one or multiple of these solvents.

(Die)

The die 5 may be one produced by the following method. First, a film of aluminum that is a material of the die 5 is formed on a surface of a support by sputtering. Next, the resulting aluminum layer is repetitively subjected to anodizing and etching. Thereby, a cavity (die 5) of the moth-eye structure can be produced. At this time, the uneven structure of the die 5 can be modified by adjusting the duration of the anodizing and the duration of the etching.

Examples of a material of the support include glass; metal materials such as stainless steel and nickel; polyolefinic resins such as polypropylene, polymethylpentene, and cyclic olefinic polymers (typified by norbornene-based resin, e.g., "Zeonor®" from Zeon Corp., "Acton®" from JSR Corp.); polycarbonate resin; and resin materials such as polyethylene terephthalate, polyethylene naphthalate, and triacetyl cellulose. Instead of the support with an aluminum film formed on the surface, an aluminum support may be used.

The die 5 may have a shape of a flat plate or a roll, for example.

The surface of the die 5 preferably has undergone release treatment. Thereby, the die 5 can be easily removed from the polymer layer 6. Further, this treatment makes the surface free energy of the die 5 low, and thus the active component of the release agent can efficiently be distributed on the surface (the surface opposite to the substrate 2) of the resin layer 4 when the substrate 2 is pushed to the die 5 in Process (4) of Method 1. Further, this treatment can prevent early removal of the active component of the release agent from the surface (the surface opposite to the substrate 2) of the resin layer 4 before curing of the resin layer 4. As a result, in the antifouling film 1, the active component of the release agent can efficiently be distributed on the surface (the surface opposite to the substrate 2) of the polymer layer 6.

Examples of a material to be applied in the release treatment for the die 5 include fluorine-based materials, silicone-based materials, and phosphate-ester-based materials. Known examples of the fluorine-based materials include "Optool DSX" from Daikin Industries, Ltd. and "Optool AES4" from Daikin Industries, Ltd.

Method 2

Figure 4:
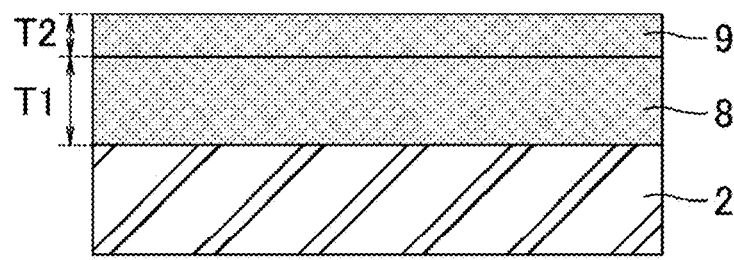
FIG. 4 includes schematic cross-sectional views illustrating Method 2 of producing the antifouling film according to the embodiment.
Figure 4:
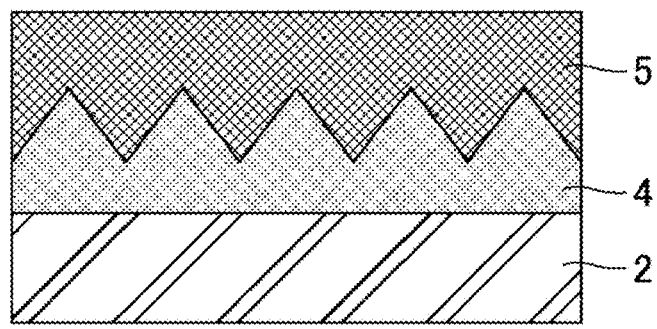
Figure 4:
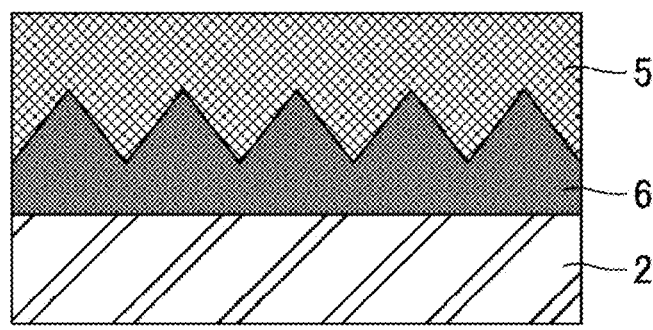
Figure 4:
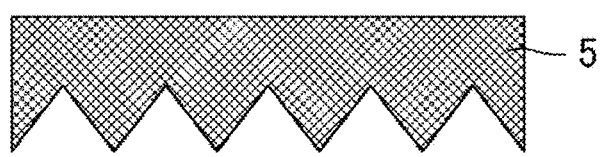
Figure 4:
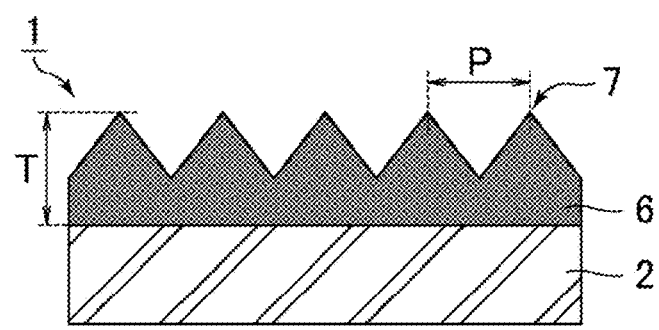

FIG. 4 includes schematic cross-sectional views illustrating Method 2 of producing the antifouling film according to the embodiment. Method 2 is the same as Method 1, except that the photo-curable resin and the release agent are applied in separate two layers and then integrated with each other. Thus, descriptions of the same features are omitted as appropriate.

(Process (1): Application of First Resin and Second Resin)

As shown in FIG. 4(a), a first resin 8 containing a photo-curable resin is applied to a surface of the substrate 2. Next, a second resin 9 containing a release agent is applied to the surface (the surface opposite to the substrate 2) of the first resin 8 applied.

Examples of techniques of applying the first resin 8 and the second resin 9 include spray coating, gravure coating, slot-die coating, and bar coating. For application of the first resin 8, gravure coating or slot-die coating is preferred in order to level the thickness of the film applied and to achieve good productivity. For application of the second resin 9, spray coating is preferred. In the case of spray coating, a swirl nozzle, an electrostatic nozzle, or an ultrasonic nozzle is preferably used.

The first resin 8 and the second resin 9 may be applied either non-simultaneously or simultaneously. An example of a method of applying the first resin 8 and the second resin 9 simultaneously is co-extruding application.

(Process (2): Formation of Resin Layer)

As shown in FIG. 4(b), the substrate 2 is pushed to the die 5 such that the first resin 8 side thereof faces the die 5 with the first resin 8 and the second resin 9 in between. As a result, the resin layer 4 having an uneven structure on the surface (the surface opposite to the substrate 2) is formed. In the resin layer 4, the first resin 8 and the second resin 9 are integrated with each other and no interface exists between the resins.

(Process (3): Curing of Resin Layer)

Next, the resin layer 4 is cured by light irradiation. As a result, as shown in FIG. 4(c), the polymer layer 6 is formed.

(Process (4): Release of Die)

As shown in FIG. 4(d), the die 5 is released from the polymer layer 6. As a result, the antifouling film 1 is completed.

In Method 2, the release agent in the second resin 9 is insolubilized by applying the first resin 8 and the second resin 9, which are incompatible with each other, in separate two layers (Process (1)) and then integrating the layers (Process (2)). Thereby, the active component of the release agent is likely to be distributed on the surface (the surface opposite to the substrate 2) of the resin layer 4. Further, since the second resin 9 that mainly constitutes the surface (the surface opposite to the substrate 2) of the resin layer 4 contains the release agent, the active component of the release agent is likely to be distributed on the surface (the surface opposite to the substrate 2) of the resin layer 4. Therefore, the active component of the release agent can efficiently be distributed on the surface (the surface opposite to the substrate 2) of the polymer layer 6 even without increasing the active component content of the release agent.

The second resin 9 contains a release agent. Similar to Method 1, the release agent in the second resin 9 is preferably a fluororesin containing a photo-reactive group, i.e., a fluorine-based release agent. Fluororesins have a low surface free energy, and thus are preferred so as to improve the antifouling properties (e.g., ease of wiping off fingerprints). In addition to the release agent, the second resin 9 may contain various monomers as appropriate.

The resin layer 4 contains the active component of the release agent in an amount of preferably 0.1 wt % or more and 10 wt % or less, more preferably 0.5 wt % or more and 9 wt % or less, still more preferably 1 wt % or more and 5 wt % or less. If the active component content of the release agent in the resin layer 4 is less than 0.1 wt %, the amount of the active component of the release agent on the surface (the surface opposite to the substrate 2) of the polymer layer 6 (second resin 9) may be too small, which may unfortunately cause poor antifouling properties and rubbing resistance. If the active component content of the release agent in the resin layer 4 is more than 10 wt %, the amount of the active component of the release agent on the surface (the surface opposite to the substrate 2) of the polymer layer 6 (second resin 9) may be too large. This may unfortunately cause poor elasticity of the polymer layer 6 (projections 7), and projections 7 fallen by rubbing the surface (the surface opposite to the substrate 2) of the polymer layer 6 may fail to rise (restore) again. As a result, the rubbing resistance may be poor.

The first resin 8 contains a photo-curable resin. Similar to Method 1, the photo-curable resin in the first resin 8 may contain components such as various monomers and a photo-polymerization initiator as appropriate.

Similar to Method 1, the photo-curable resin in the first resin 8 preferably contains a compatible monomer that is compatible with the release agent in the second resin 9. The presence of the compatible monomer allows the active component of the release agent to be uniformly distributed on the surface (the surface opposite to the substrate 2) of the polymer layer 6 (second resin 9), possibly improving the antifouling properties. Further, the compatible monomer can increase the adhesion between the photo-curable resin and the release agent, possibly improving the rubbing resistance. When the photo-curable resin contains a compatible monomer, the compatible monomer itself is compatible with the release agent, but the first resin 8 as a whole is not compatible with the second resin 9.

The photo-curable resin contains the compatible monomer in an amount of preferably 5 wt % or more and 30 wt % or less, more preferably 10 wt % or more and 25 wt % or less, still more preferably 15 wt % or more and 25 wt % or less. If the compatible monomer content in the photo-curable resin is less than 5 wt %, the antifouling properties and the rubbing resistance may unfortunately be poor, especially in a high-temperature/high-humidity environment. If the compatible monomer content in the photo-curable resin is more than 30 wt %, the polymer layer 6 may have a low crosslinking density and a strong cohesive force between bonds, so that the polymer layer 6 may have high hardness. This may unfortunately cause poor rubbing resistance, especially in a high-temperature/high-humidity environment.

Neither the first resin 8 nor the second resin 9 preferably contains a solvent. In other words, the first resin 8 and the second resin 9 are preferably of solvent-free. Such a configuration enables reduction in the cost relating to the use of a solvent and in environmental load (e.g., bad odor in use). Further, this configuration eliminates the need for a device for removing a solvent, enabling reduction in the cost relating to such a device.

The thickness T1 of the first resin 8 is preferably 3 μm or greater and 30 μm or smaller, more preferably 5 μm or greater and 7 μm or smaller.

The thickness T2 of the second resin 9 is preferably 0.1 μm or greater and 15 μm or smaller, more preferably 1 μm or greater and 10 μm or smaller, still more preferably 2 μm or greater and 8 μm or smaller, particularly preferably 5 μm or greater and 8 μm or smaller.

Method 3

Figure 5:
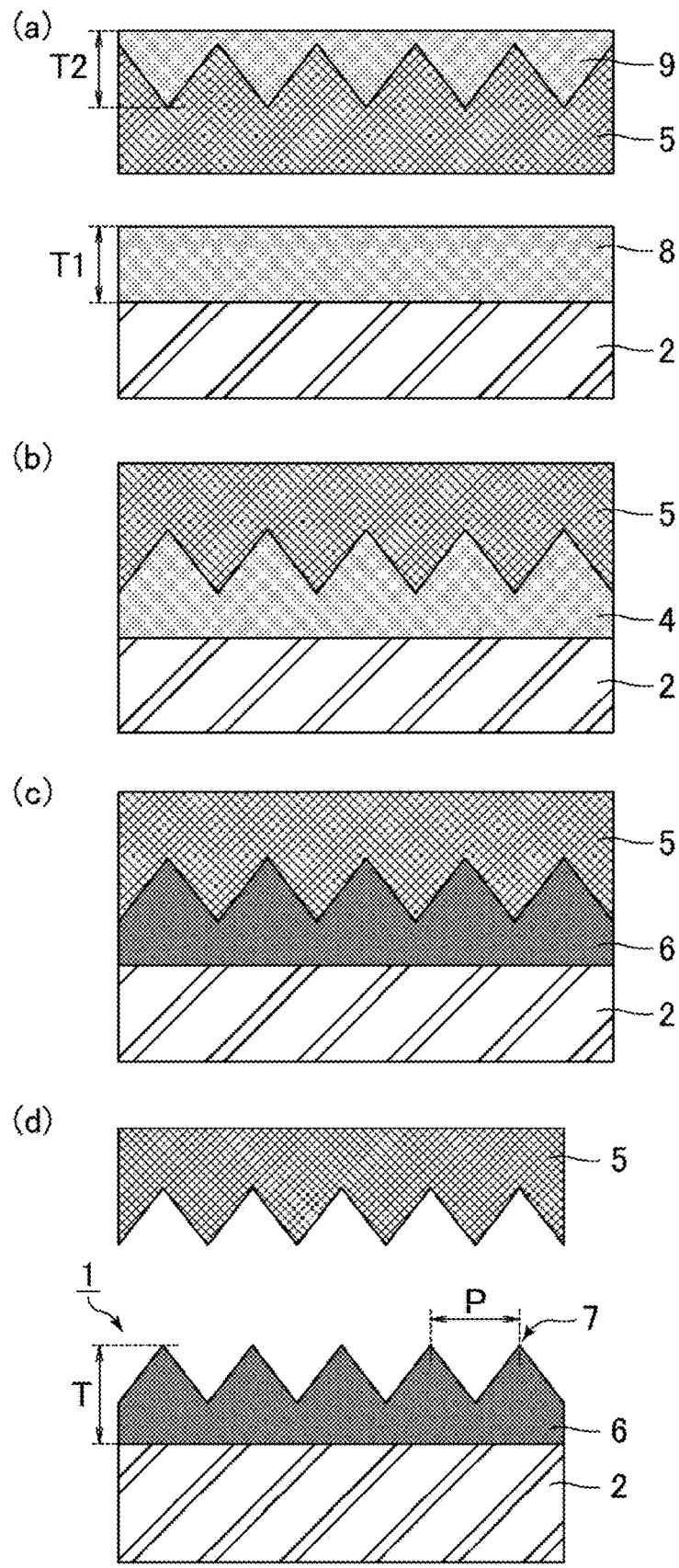
FIG. 5 includes schematic cross-sectional views illustrating Method 3 of producing the antifouling film according to the embodiment.
Figure 6:
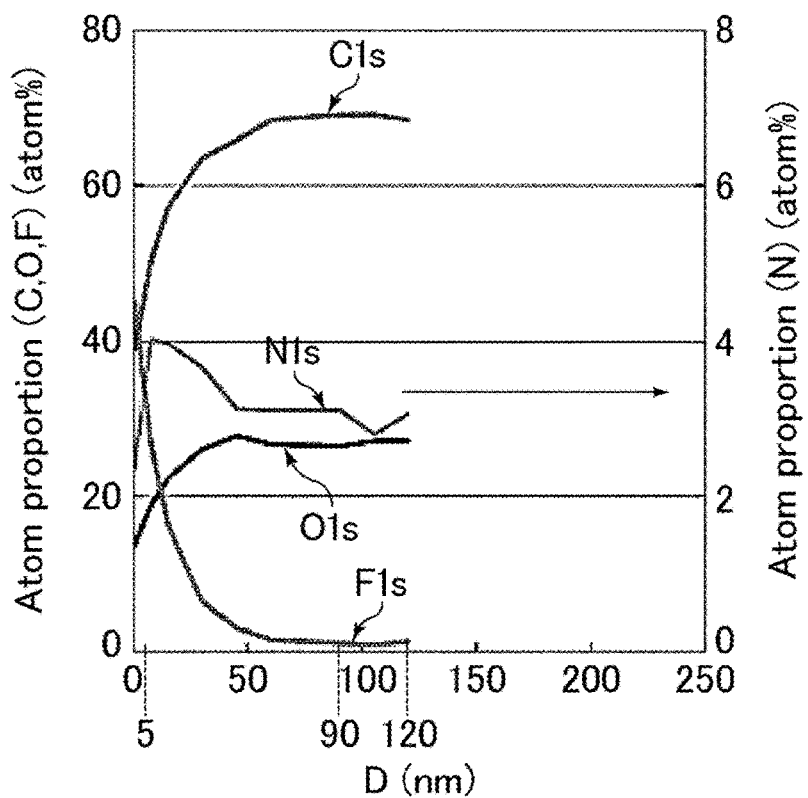
FIG. 6 is a graph showing the results of measurement using a GCIB-XPS device on an antifouling film of Example 1.
Figure 7:
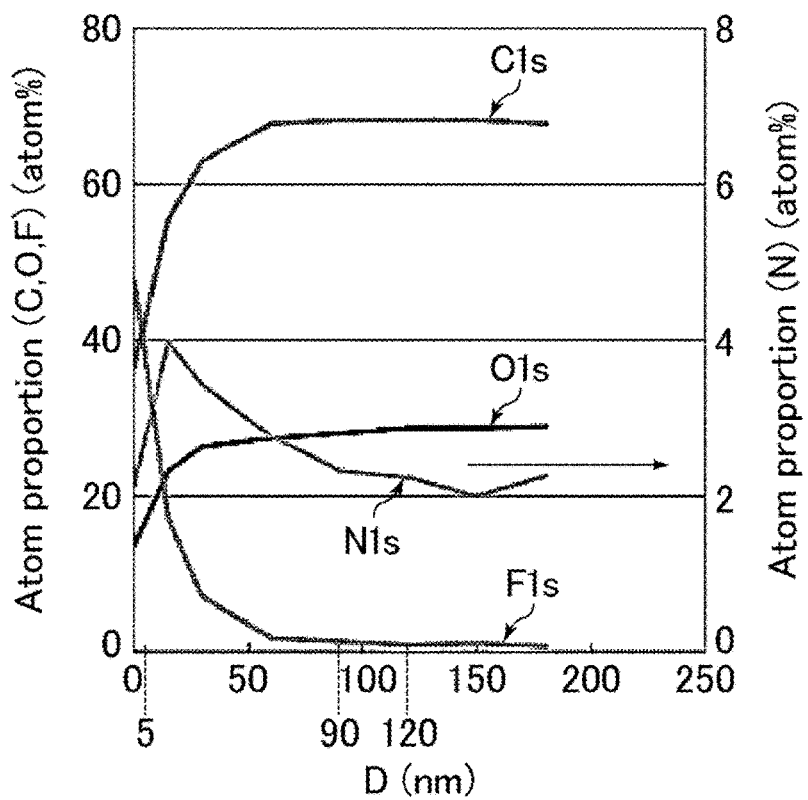
FIG. 7 is a graph showing the results of measurement using a GCIB-XPS device on an antifouling film of Example 5.
Figure 8:
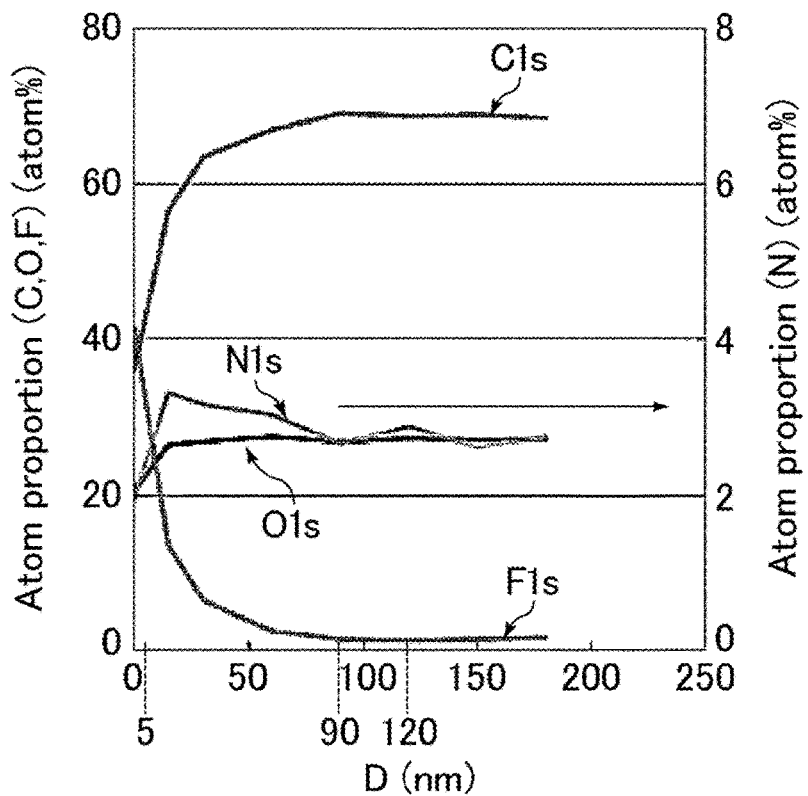
FIG. 8 is a graph showing the results of measurement using a GCIB-XPS device on an antifouling film of Example 6.
Figure 9:
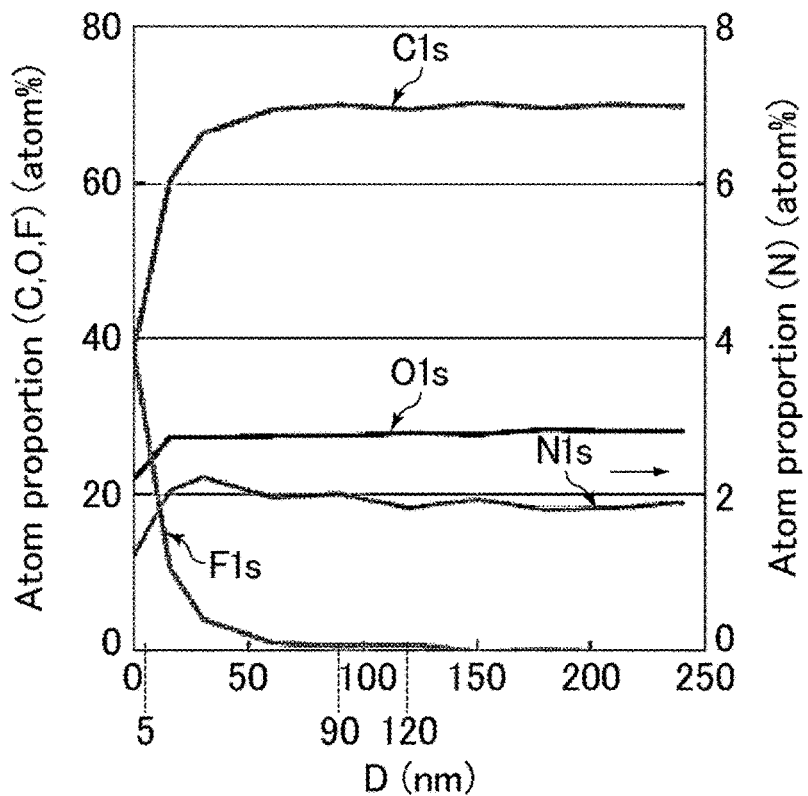
FIG. 9 is a graph showing the results of measurement using a GCIB-XPS device on an antifouling film of Example 7.
Figure 10:
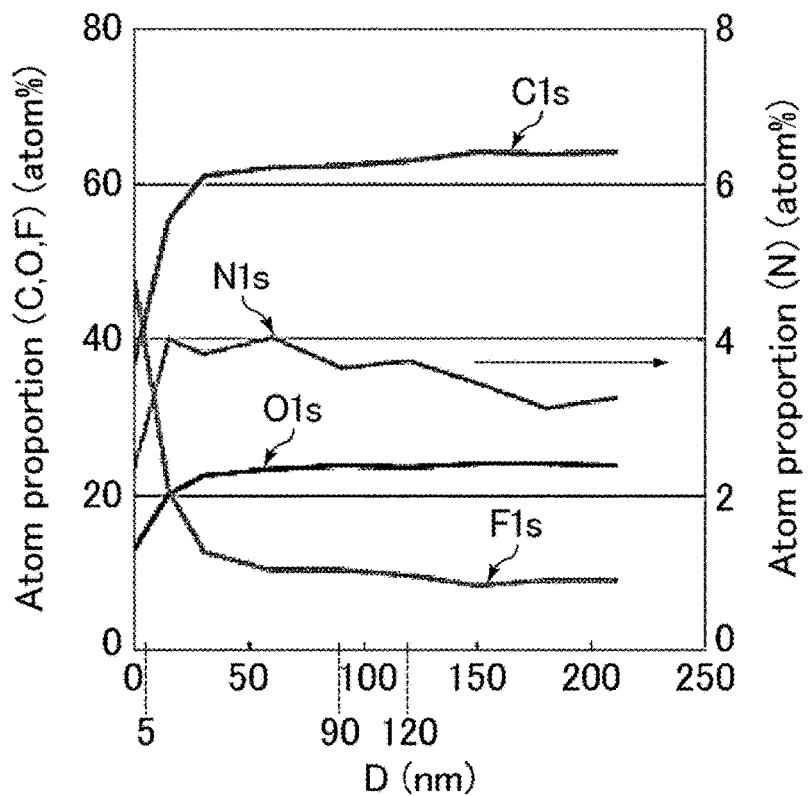
FIG. 10 is a graph showing the results of measurement using a GCIB-XPS device on an antifouling film of Comparative Example 1.
Figure 11:
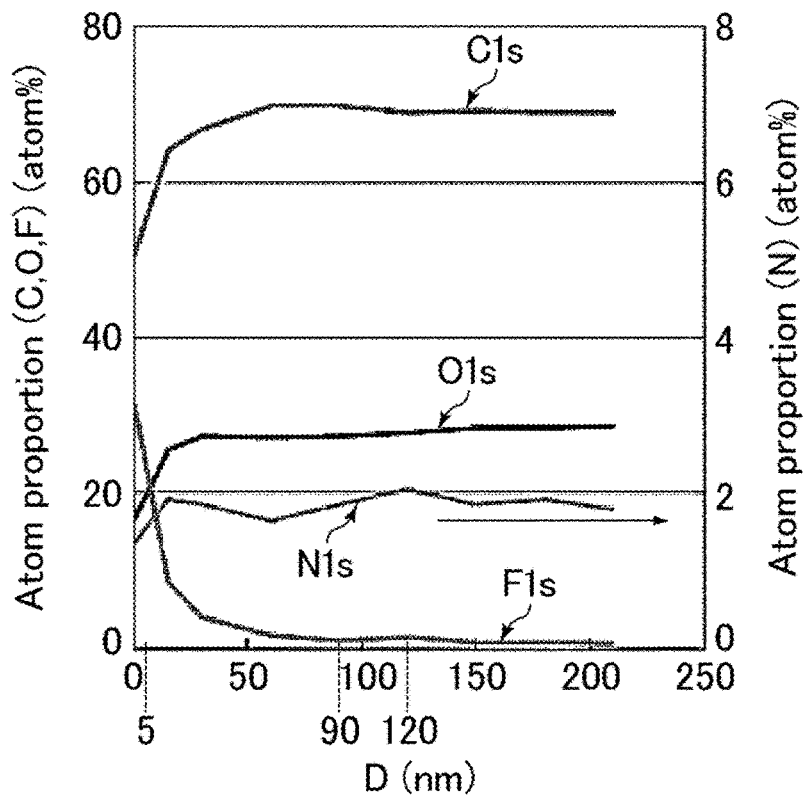
FIG. 11 is a graph showing the results of measurement using a GCIB-XPS device on an antifouling film of Comparative Example 2.
Figure 12:
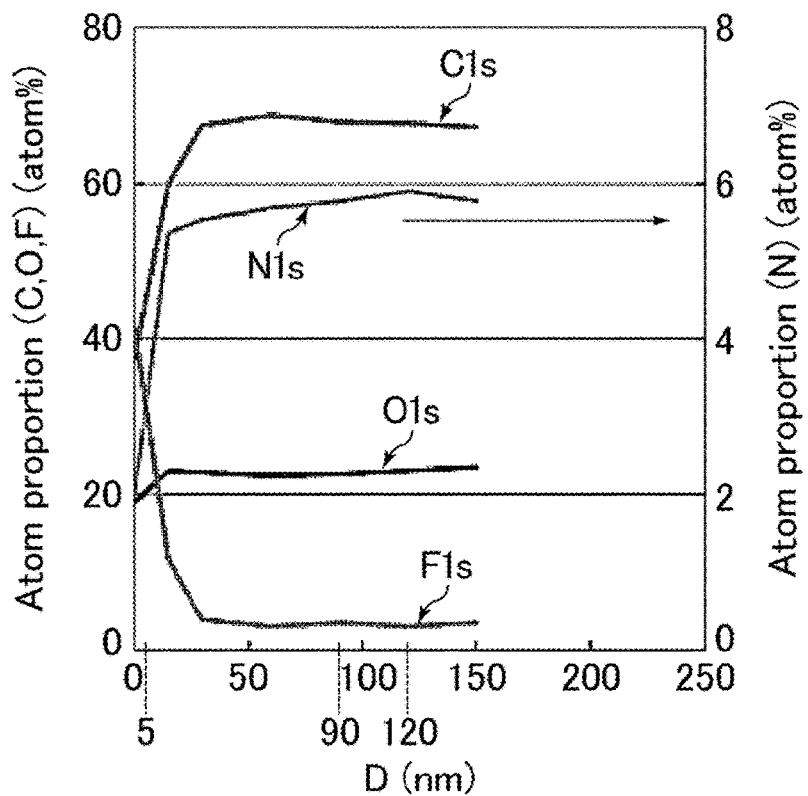
FIG. 12 is a graph showing the results of measurement using a GCIB-XPS device on an antifouling film of Comparative Example 3.
Figure 13:
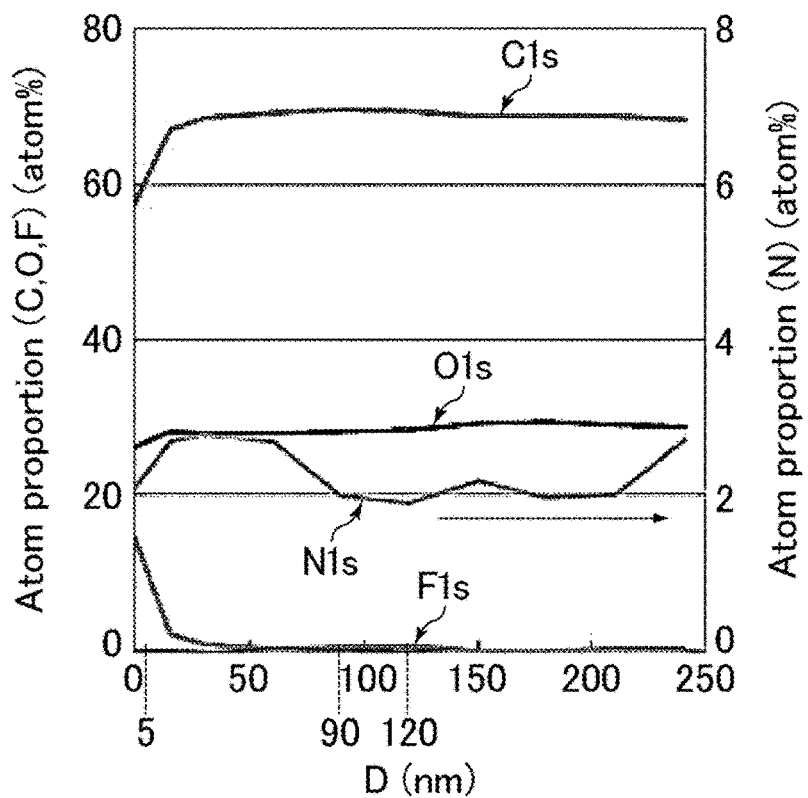
FIG. 13 is a graph showing the results of measurement using a GCIB-XPS device on an antifouling film of Comparative Example 4.
Figure 14:
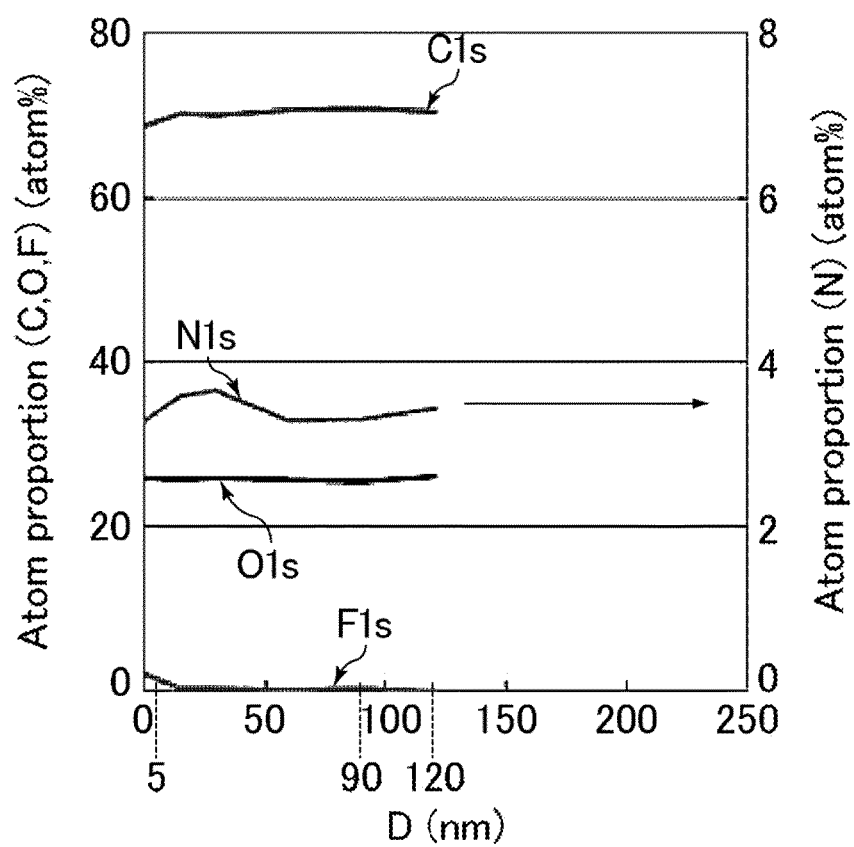
FIG. 14 is a graph showing the results of measurement using a GCIB-XPS device on an antifouling film of Comparative Example 5.

FIG. 5 includes schematic cross-sectional views illustrating Method 3 of producing the antifouling film according to the embodiment. Method 3 is the same as Method 2 of producing the antifouling film, except that the second resin is applied to the surface of a die. Thus, descriptions of the same features are omitted as appropriate.

(Process (1): Application of First Resin and Second Resin)

As shown in FIG. 5(a), the first resin 8 containing a photo-curable resin is applied to a surface of the substrate 2. Next, the second resin 9 containing a release agent is applied to the surface (uneven surface) of the die 5.

The first resin 8 and the second resin 9 may be applied either non-simultaneously or simultaneously.

(Process (2): Formation of Resin Layer)

As shown in FIG. 5(b), the substrate 2 is pushed to the die 5 such that the first resin 8 side thereof faces the die 5 with the first resin 8 and the second resin 9 in between. As a result, the resin layer 4 having an uneven structure on the surface (the surface opposite to the substrate 2) is formed.

(Process (3): Curing of Resin Layer)

Next, the resin layer 4 is cured by light irradiation. As a result, as shown in FIG. 5(c), the polymer layer 6 is formed.

(Process (4): Release of Die)

As shown in FIG. 5(d), the die 5 is released from the polymer layer 6. As a result, the antifouling film 1 is completed.

In Process (1) of Methods 2 and 3, the first resin 8 is applied to a surface of the substrate 2 and the second resin 9 is applied to a surface of the first resin 8 or the die 5. Still, the second resin 9 may be applied to both a surface of the first resin 8 and a surface of the die 5. In other words, Process (1) may be performed such that the first resin 8 is applied to a surface of the substrate 2 and the second resin 9 is applied to one or both of a surface of the first resin 8 and a surface of the die 5. Alternatively, Process (1) may be performed such that the second resin 9 is applied to the surface (uneven surface) of the die 5 and the first resin 8 is applied to the surface (the surface opposite to the die 5) of the second resin 9.

The polymer layer 6 of the antifouling film according to the embodiment has a proportion of the number of the fluorine atoms relative to the sum of the numbers of the carbon atoms, the nitrogen atoms, the oxygen atoms, and the fluorine atoms measured by X-ray photoelectron spectroscopy (XPS) of 33 atom % or more on the surface of the uneven structure. Thereby, sufficient antifouling properties (water repellency and oil repellency) can be achieved. The proportion of the number of the fluorine atoms on the surface of the uneven structure is preferably 43 atom % or more, more preferably 48 atom % or more. The proportion of the number of the fluorine atoms on the surface of the uneven structure is preferably 55 atom % or less, more preferably 50 atom %. If the proportion of the number of the fluorine atoms on the surface of the uneven structure is more than 55 atom %, the polymer layer 6 may unfortunately be cloudy.

The proportion of the number of the fluorine atoms is 3 atom % or less, preferably 1.4 atom % or less, on average in a region 90 to 120 nm deep from the surface of the uneven structure. Further, the proportion of the number of the nitrogen atoms relative to the sum of the numbers of the carbon atoms, the nitrogen atoms, the oxygen atoms, and the fluorine atoms measured by X-ray photoelectron spectroscopy is 4 atom % or less, preferably 3.2 atom % or less, on average in a region 90 to 120 nm deep from the surface of the uneven structure.

The above measurement is performed at an X-ray beam diameter of 100 μm, an analysis area of 1000 μm×500 μm, and a photoelectron take-off angle of 45°. The measured value in a region 90 to 120 nm deep from the surface of the uneven structure is obtainable by measurement with the surface of the uneven structure etched using an XPS measurement device (GCIB-XPS) provided with an argon gas cluster ion beam (GLIB).

The results of the analysis using a GCIB-XPS measurement device show that adjusting the fluorine concentration and the nitrogen concentration in a region 90 to 120 nm deep from the surface of the uneven structure to the respective specific values or lower enables sufficient antifouling properties (water repellency and oil repellency) as well as sufficient rubbing resistance. In other words, is found that increasing the fluorine concentration on the surface of the uneven structure is effective to achieve antifouling properties, but excessive introduction of fluorine atoms into the polymer layer 6 causes generation of a site with very low rubbing resistance on the film surface. Thus, adjusting the fluorine concentration in the polymer layer 6 to a specific value or lower enables excellent rubbing resistance.

Further, introduction of a nitrogen-containing component into the polymer layer 6 can lead to improved solubility of the fluorine-containing component such as the release agent and the resin component such as the photo-curable resin. In particular, when the fluorine-containing component such as the release agent is a material containing a fluorine chain and an amide structure, the presence of a material containing an amide structure as a nitrogen-containing component can greatly improve the solubility. Still, it is found that excessive introduction of nitrogen atoms into the polymer layer 6 causes generation of a site with very low rubbing resistance on the film surface. Thus, adjusting the nitrogen concentration in the polymer layer 6 to a specific value or lower enables excellent rubbing resistance.

The antifouling film according to the above embodiment may be any one that utilizes the antifouling properties on the film surface owing to the moth-eye structure (a structure like a moth's eye), and may be an optical film that also utilizes the antireflective properties on the film surface owing to the moth-eye structure. Such an optical film may contribute to improvement of the visibility when attached to the inside or outside of a display device.

In order to achieve the antifouling properties, the antifouling film preferably has a surface that shows a contact angle of 130° or greater with water. Further, the antifouling film preferably has a surface that shows a contact angle of 30° or greater with hexadecane.

Hereinafter, the present invention is described in more detail based on examples and comparative examples. The examples, however, are not intended to limit the scope of the present invention.

The materials used in production of the antifouling films in the examples and comparative examples were as follows.
(Substrate)
"TAC-TD80U" from Fujifilm Corp. was used. The thickness thereof was 80 μm.
(Polymer Layer)
The polymer layer was formed from the materials shown in Table 1. The abbreviations of the respective materials are as follows. The values in Table 1 each refer to the material content (unit: wt %) in the photo-curable resin. The active component in the release agent means a compound containing a fluorine atom in the molecule.
<Release Agent (Antifouling Agent)>
  A: "Optool DAC" from Daikin Industries, Ltd. (active component concentration: 100 wt %)
  B: "Optool DAC-HP" from Daikin Industries, Ltd. (active component concentration: 20 wt %)
  C: "CHEMINOX FAAC-6" from Unimatec Co (active component concentration: 100 wt %)
  D: 20 wt % of "Megaface RS-76-NS" from DIC Corp. (perfluoroalkyl-containing monomer, active component)/80 wt % of dipropylene glycol diacrylate (DPGDA)
  E: "Fomblin® MT70" from Solvay (80 wt % of perfluoropolyether derivative (active component)/20 wt % of methyl ethyl ketone (MEK))
  F: 20 wt % of perfluoroalkenyl-containing monomer component, disclosed in JP 5744011 B)/80 wt % of dimethylacrylamide (DMMA)
<Photo-Curable Resin>
(Monomer)
  A: "UA-510H" from Kyoeisha Chemical Co., Ltd.
  B: "ATM-35E" from Shin Nakamura Chemical Co., Ltd.
  C: "Light Acrylate DPE-6A" from Kyoeisha Chemical Co., Ltd.
  D: "DMAA" from KJ Chemicals Corp.
  E: "ACMO" (N-acryloylmorpholine) from KJ Chemicals Corp.
  F: "Megaface R-43" (fluorosurfactant) from DIC Corp.
(Photo-polymerization initiator)
  "819": "IRGACURE 819" from BASF SE

TABLE 1

|  |  | Example 1 | Example 2 | Example 3 | Example 4 | Example 5 | Example 6 | Example 7 | Comparative Example 1 |
|---|---|---|---|---|---|---|---|---|---|
| Active component of release agent in resin | | 2 wt % | 1 wt % | 3 wt % | 5 wt % | 5 wt % | 2 wt % | 1 wt % | 5 wt % |
| Release agent | A | 2 | 1 | 3 | 5 | 0 | 0 | 0 | 5 |
|  | B | 0 | 0 | 0 | 0 | 25 | 0 | 0 | 0 |

TABLE 1-continued

|  |  |  |  |  |  |  |  |  |  |
|---|---|---|---|---|---|---|---|---|---|
|  | C | 0 | 0 | 0 | 0 | 0 | 0 | 0 | 0 |
|  | D | 0 | 0 | 0 | 0 | 0 | 0 | 0 | 0 |
|  | E | 0 | 0 | 0 | 0 | 0 | 2.5 | 0 | 0 |
|  | F | 0 | 0 | 0 | 0 | 0 | 0 | 5 | 0 |
| Monomer | A | 8 | 8 | 7.5 | 7 | 6 | — | 8 | 4 |
|  | B | 43.5 | 45 | 42.5 | 40 | 35 | 40.5 | 43.5 | 22 |
|  | C | 18 | 18.5 | 17.5 | 16.5 | 14 | 30 | 18 | 10 |
|  | D | 23.5 | 24 | 23 | 22 | 18 | 25 | 23.5 | 13 |
|  | E | 3 | 1.5 | 4.5 | 7.5 | 0 | 0 | 0 | 20 |
|  | F | 0 | 0 | 0 | 0 | 0 | 0 | 0 | 25 |
| Initiator | 819 | 2 | 2 | 2 | 2 | 2 | 2 | 2 | 1 |

|  |  | Comparative Example 2 | Comparative Example 3 | Comparative Example 4 | Comparative Example 5 | Comparative Example 6 |
|---|---|---|---|---|---|---|
| Active component of release agent in resin |  | 5 wt % | 5 wt % | 0 | 0 | 0 |
| Release agent | A | 0 | 0 | 0 | 0 | 0 |
|  | B | 0 | 0 | 0 | 0 | 0 |
|  | C | 5 | 0 | 0 | 0 | 0 |
|  | D | 0 | 25 | 0 | 0 | 0 |
|  | E | 0 | 0 | 0 | 0 | 0 |
|  | F | 0 | 0 | 0 | 0 | 0 |
| Monomer | A | 8 | 6 | 8 | 6 | 5 |
|  | B | 43.5 | 35 | 46 | 37 | 28 |
|  | C | 18 | 14 | 19 | 15 | 11 |
|  | D | 23.5 | 18 | 25 | 20 | 15 |
|  | E | 0 | 0 | 0 | 20 | 40 |
|  | F | 0 | 0 | 0 | 0 | 0 |
| Initiator | 819 | 2 | 2 | 2 | 2 | 1 |

(Solvent)

Methyl ethyl ketone (MEK, boiling point: 79.6° C.) was used.

(Die)

A die produced by the following method was used. First, a film of aluminum that is a material of the die was formed on a surface of a 10-cm-square glass substrate by sputtering. The thickness of the resulting aluminum layer was 1.0 μm. Next, the resulting aluminum layer was repetitively subjected to anodizing and etching. Thereby, an anodizing layer was formed with many fine pores (distance between the bottom points of adjacent pores was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation. The surface of the die was subjected to release treatment with "Optool AES4" from Daikin Industries, Ltd. in advance.

Example 1

An antifouling film of Example 1 was produced by Method 1.

(Process (1): Preparation of Resin Solution)

The photo-curable resin and the release agent were mixed in accordance with the composition shown in Table 1, and the mixture was dissolved in a solvent. Thereby, the resin solution 3 was prepared. The active component ("Optool DAC-HP") content of the release agent in the resin solution 3 was 2 wt %.

(Process (2): Application of Resin Solution)

The resin solution 3 was dropped on (applied to) a surface of the substrate 2 in a stripe pattern. Then, the resin solution 3 was spread on the entire surface of the substrate 2 using a bar coater.

(Process (3): Formation of Resin Layer)

The workpiece with the resin solution 3 applied to the surface of the substrate 2 was heated in an oven at 80° C. for one minute, so that the solvent was evaporated from the applied resin solution 3. As a result, the resin layer 4 was formed.

(Process (4): Formation of Uneven Structure)

The substrate 2 was pushed to the die 5 with the resin layer 4 in between using a hand roller. As a result, the uneven structure was formed on the surface (the surface opposite to the substrate 2) of the resin layer 4.

(Process (5): Curing of Resin Layer)

The resin layer 4 having the uneven structure on the surface thereof was irradiated with ultraviolet rays (dose: 200 mJ/cm$^2$) from the substrate 2 side, so that the resin layer 4 was cured. As a result, the polymer layer 6 was formed.

(Process (6): Release of Die)

The die 5 was released from the polymer layer 6. As a result, the antifouling film 1 was completed. The thickness T of the polymer layer 6 was 9.8 μm.

The surface specifications of the antifouling film 1 were as follows.

Shape of projections 7: temple-bell-like shape
Pitch P between adjacent projections 7: 200 nm
Height of projection 7: 200 nm
Aspect ratio of projection 7:1

The surface specifications of the antifouling film 1 were evaluated using a scanning electron microscope "S-4700" from Hitachi High-Technologies Corp. For the evaluation, an osmium metal film (thickness: 5 nm) of osmium(VIII)

oxide from Wako Pure Chemical Industries, Ltd. was formed on the surface (the surface opposite to the substrate 2 of the polymer layer 6) of the antifouling film 1 by plasma CVD film formation using an osmium coater "NEOC-AN" from Meiwafosis Co., Ltd. Specifically, the pitch P between adjacent projections 7 was defined as the average value of the distances of all the pairs of adjacent projections except for branched projections within a 1-μm-square region in a plane image taken by the above scanning electron microscope. The height of projection 7 was defined as the average value of the heights of 10 consecutive projections except for branched projections in a cross-sectional image taken by the above scanning electron microscope. It should be noted that 10 projections were selected so as not to include projections having any defect or deformed portion (e.g., a portion accidentally deformed during preparation of a measurement sample).

Examples 2 to 7 and Comparative Examples 1 to 6

An antifouling film of each example was produced in the same manner as in Example 1, except that the composition was changed as shown in Table 1.
(GCIB-XPS Measurement)

In order to investigate the distribution of the constituent atoms of the polymer layer for the antifouling films produced in the respective examples and comparative examples, each antifouling film was subjected to X-ray photoelectron spectroscopy with the uneven structure being etched by a gas cluster ion beam (GCIB).

The gas cluster ion beam is an ion beam consisting of several tens to several thousands of atoms and having a very low energy per atom. For example, an argon gas cluster ion beam generates no residual sputtering atom after sputtering of a sample, and thus can achieve ultra-low energy ion etching of about 1 to 20 eV per atom which cannot be achieved by C60 ions. Also, argon gas cluster ions hardly caused a chemical change on the sample surface after sputtering, and thus enable etching on organic matter. The measurement device used was an X-ray photoelectron spectroscope (trade name: PHI 5000 VersaProbe II) from Ulvac-Phi, Inc. equipped with an argon gas cluster sputtering ion gun (trade name: 06-2000).

The measurement conditions for X-ray photoelectron spectroscopy were as follows.
  X-ray beam diameter: 100 μm
  Analysis area: 1000 μm×500 μm
  Photoelectron take-off angle: 45°
  Pass energy: 46.95 eV The conditions for argon gas cluster ion beam sputtering (etching) and the conditions for charge neutralization were as follows.
<Sputtering Conditions>
  Ion source: argon gas cluster ion beam
  Accelerating voltage: 10 kV (15 mA Emission)
  Zalar rotation speed: 1 rotation/min
  Sputtering rate (etching rate): 10 nm/min
<Charge Neutralization Conditions>
  Electron gun: Bias 1.0 V (20 μA Emission)
  Ion gun: 1 V or 3 V (7 mA Emission)

Based on the data obtained from the above measurement, the relationship was calculated and represented graphically between the distance from the surface of the uneven structure in the depth direction and the proportion of the number of each atom species relative to the sum of the numbers of the carbon atoms, the nitrogen atoms, the oxygen atoms, and the fluorine atoms in the polymer layer. FIGS. 6 to 14 are graphs showing the results of measurement using the GCIB-XPS device on the antifouling films of Examples 1, 5, 6, and 7 and Comparative Examples 1 to 5. In FIGS. 6 to 14, the horizontal axis D represents the distance (unit: nm) from the surface of the uneven structure in the depth direction, while the vertical axes "Atom proportion" each represent the proportion (unit: atom %) of the number of each atom species relative to the sum of the numbers of the carbon atoms, the nitrogen atoms, the oxygen atoms, and the fluorine atoms.

The proportion of the number of the fluorine atoms and the proportion of the number of the nitrogen atoms were calculated on the surface of the uneven structure and in a region 90 to 120 nm deep from the surface of the uneven structure (average proportions for the latter). Table 2 shows the results. In Table 2, the proportion of the number of the fluorine atoms and the proportion of the number of the nitrogen atoms on the surface of the uneven structure were respectively expressed as "Surface F concentration" and "Surface N concentration", while the proportion of the number of the fluorine atoms and the proportion of the number of the nitrogen atoms in a region 90 to 120 nm deep from the surface of the uneven structure were respectively expressed as "In resin F concentration" and "In resin N concentration".
(Evaluations of Characteristics)

The antifouling films produced in the examples and the comparative examples were evaluated in terms of the antifouling properties (contact angles), rubbing resistance, and ease of wiping off fingerprints. Table 2 shows the results.
<Antifouling Properties>

For the antifouling properties, the water repellency and the oil repellency were evaluated.

The water repellency was evaluated by the contact angle of water on the surface (the surface opposite to the substrate of the polymer layer) of the antifouling film of each example. Specifically, water was dropped on the surface (the surface opposite to the substrate of the polymer layer) of the antifouling film of each example, and the contact angle thereof was measured immediately after the dropping.

The oil repellency was evaluated by the contact angle of hexadecane on the surface (the surface opposite to the substrate of the polymer layer) of the antifouling film of each example. Specifically, hexadecane was dropped on the surface (the surface opposite to the substrate of the polymer layer) of the antifouling film of each example, and the contact angle was measured immediately after the dropping and 10 seconds thereafter.

The contact angles of water and hexadecane were each the average value of contact angles measured at the following three points by the θ/2 method (θ/2=arctan(h/r), wherein θ: contact angle, r: radius of droplet, h: height of droplet) using a portable contact angle meter "PCA-1" from Kyowa Interface Science Co., Ltd. The first measurement point selected was the central portion of the antifouling film of each example. The second and third measurement points were two points that are 20 mm or more apart from the first measurement point and are point-symmetrical to each other about the first measurement point.
<Rubbing Resistance (Tissue-Rubbing Resistance)>

The rubbing resistance was evaluated by the following method. First, the surface. (the surface opposite to the substrate of the polymer layer) of the antifouling film of each example was rubbed with a tissue a few times. Then, the degree of whitening at the portion rubbed with the tissue was visually observed in a direction forming a small angle with the surface in an environment with an illuminance of 100 lx (under a fluorescent lamp). The evaluation criteria were as follows.

Good: No change occurred (no whitening was observed).
Fair: Slight whitening was observed.
Poor: Obvious whitening was observed.

The cases evaluated as good were considered as within the allowable level (having excellent rubbing resistance).

<Ease of Wiping Off Fingerprints>

The ease of wiping off fingerprints was evaluated by the following method. First, for the antifouling film of each example, a black acrylic sheet was attached to the surface opposite to the polymer layer of the substrate with an optical adhesive layer in between. Next, the antifouling film of each example was left in an environment at a temperature of 60° C. and a humidity of 95% for 101 days, and further in an environment at a temperature of 23° C. and a humidity of 50% for one day. Then, a fingerprint was left on the surface (the surface opposite to the substrate of the polymer layer) of the antifouling film of each example, and the surface was rubbed 10 reciprocations using "Bemcot® S-2" from Asahi Kasei Fibers Corp. Whether the fingerprint was wiped off or not was visually observed in an environment with an illuminance of 100 lx. The evaluation criteria were as follows.

Good: The fingerprint was completely wiped off and no wiping residue was observed.
Fair: The fingerprint was not obvious, but slight wiping residue was observed when the light from a fluorescent lamp was reflected on the surface.
Poor: The fingerprint was not wiped off at all.

The cases evaluated as good were considered as within the allowable level (having excellent antifouling properties).

small contact angle with hexadecane, but showed good ease of wiping off fingerprints and an excellent contact angle with water and excellent rubbing resistance. In contrast, the antifouling film of Comparative Example 1 had a high fluorine concentration in the resin and showed insufficient rubbing resistance. The antifouling films of Comparative Example 2 and 4 to 6 had a low fluorine concentration on the surface and showed insufficient ease of wiping off fingerprints. The antifouling film of Comparative Example 3 had a high nitrogen concentration in the resin and showed insufficient rubbing resistance and ease of wiping off fingerprints.

The antifouling films of Examples 1 and 3 also showed good adhesion between the substrate and the polymer layer as determined by the following method.

<Adhesion>

First, 11 vertical cuts and 11 horizontal cuts were made in a grid pattern with 1 mm spacing on the surface (the surface opposite to the substrate of the polymer layer) of the antifouling film of each example using a snap-off utility knife. Thereby, 100 squares (1 mm square) were formed. Then, polyester adhesive tape "No. 31B" from Nitto Denko Corp. was press-applied to the squares and peeled off in the 90° direction relative to the surface of the squares at a rate of 100 mm/s. The state of the polymer layer on the substrate after the peeling was visually observed, and the number of squares in which the polymer layer was not peeled off but left on the substrate was counted.

Additional Remarks

One aspect of the present invention relates to an antifouling film including a polymer layer that includes on a surface

TABLE 2

| | Example 1 | Example 2 | Example 3 | Example 4 | Example 5 | Example 6 | Example 7 | Comparative Example 1 |
|---|---|---|---|---|---|---|---|---|
| Surface F concentration (atom %) | 45.0 | 38.7 | 45.7 | 45.9 | 48.0 | 41.4 | 38.0 | 47.6 |
| In resin F concentration (atom %) | 1.2 | 0.9 | 1.1 | 1.2 | 1.1 | 1.4 | 0.7 | 10.3 |
| Surface N concentration (atom %) | 2.4 | 2.7 | 2.0 | 2.1 | 2.2 | 1.9 | 1.2 | 2.4 |
| In resin N concentration (atom %) | 3.0 | 3.1 | 2.9 | 3.2 | 2.3 | 2.8 | 1.9 | 3.6 |
| Contact angle (degree) Water: immediately after dropping | 164 | 158 | 162 | 164 | 159 | 153 | 154 | 160 |
| Contact angle (degree) Hexadecane: immediately after dropping | 84 | 66 | 85 | 84 | 86 | 88 | 20 | 81 |
| Contact angle (degree) Hexadecane: 10 seconds after dropping | 66 | 31 | 73 | 69 | 75 | 85 | 14 | 75 |
| Rubbing resistance | Good | Good | Good | Good | Good | Good | Good | Poor |
| Ease of wiping off fingerprints | Good | Good | Good | Good | Good | Good | Good | Good |

| | Comparative Example 2 | Comparative Example 3 | Comparative Example 4 | Comparative Example 5 | Comparative Example 6 |
|---|---|---|---|---|---|
| Surface F concentration (atom %) | 31.4 | 41.3 | 14.4 | 2.1 | 1.8 |
| In resin F concentration (atom %) | 1.2 | 3.4 | 0.2 | 0.1 | 0.0 |
| Surface N concentration (atom %) | 1.4 | 2.0 | 2.1 | 3.3 | 4.6 |
| In resin N concentration (atom %) | 2.0 | 5.8 | 2.0 | 3.4 | 4.8 |
| Contact angle (degree) Water: immediately after dropping | 164 | 164 | 20 | 22 | |
| Contact angle (degree) Hexadecane: immediately after dropping | 21 | 67 | 9 | 11 | |
| Contact angle (degree) Hexadecane: 10 seconds after dropping | 15 | 19 | 7 | 8 | |
| Rubbing resistance | Good | Poor | Good | Fair | Poor |
| Ease of wiping off fingerprints | Poor | Poor | Poor | Poor | Poor |

Table 2 demonstrates that the antifouling films of Examples 1 to 6 were excellent in terms of all of the contact angles with water and hexadecane (antifouling properties), the rubbing resistance, and the ease of wiping off fingerprints. The antifouling film of Example 7 showed a slightly thereof an uneven structure provided with multiple projections at a pitch not longer than a wavelength of visible light, the polymer layer containing carbon atoms, nitrogen atoms, oxygen atoms, and fluorine atoms as constituent atoms, the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure and of 3 atom % or less on average in a region 90 to 120 nm deep from the surface of the uneven structure, the polymer layer having a proportion of the number of the nitrogen atoms relative to the sum of the numbers of the carbon atoms, the nitrogen atoms, the oxygen atoms, and the fluorine atoms measured by X-ray photoelectron spectroscopy of 4 atom % or less on average in a region 90 to 120 nm deep from the surface of the uneven structure. This aspect can lead to an antifouling film having excellent antifouling properties and rubbing resistance.

The polymer layer may be a cured product of a resin layer containing a photo-curable resin and a release agent. This structure can improve the antifouling properties and the rubbing resistance.

The photo-curable resin may contain a compatible monomer that is compatible with the release agent. The presence of the compatible monomer allows the active component of the release agent to be easily uniformly distributed on the surface (the surface opposite to the substrate) of the polymer layer, possibly improving the antifouling properties. Further, the compatible monomer can improve the adhesion between the photo-curable resin and the release agent, possibly improving the rubbing resistance.

The photo-curable resin may contain the compatible monomer in an amount of 5 wt % or more and 30 wt % or less. If the compatible monomer content in the photo-curable resin is less than 5 wt %, the antifouling properties and the rubbing resistance may unfortunately be poor, especially in a high-temperature/high-humidity environment. If the compatible monomer content in the photo-curable resin is more than 30 wt %, the polymer layer may have a low crosslinking density and a strong cohesive force between bonds, so that the polymer layer may have high hardness. This may unfortunately cause poor rubbing resistance, especially in a high-temperature/high-humidity environment.

The release agent may contain a fluororesin that contains a fluorine-containing monomer containing a photo-reactive group. This structure can improve the antifouling properties and the rubbing resistance.

Fluorine atoms in the fluororesin may be distributed on the surface of the polymer layer. This structure can particularly improve the antifouling properties.

The fluorine-containing monomer may be represented by the following formula (A):

$$R^{f1}\text{—}R^2\text{-}D^1 \quad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is the photo-reactive group. This structure can further improve the antifouling properties.

The fluorine-containing monomer may be represented by the following formula (B) or (C):

$$CF_{n1}H_{(3-n1)}\text{—}(CF_{n2}H_{(2-n2)})_k O\text{—}(CF_{n3}H_{(2-n3)})_m O\text{—} \quad (B)$$

$$\text{—}(CF_{n4}H_{(2-n4)})_p O\text{—}(CF_{n5}H_{(2-n5)})_s O\text{—} \quad (C)$$

wherein n1 is an integer of 1 to 3; n2 to n5 are each 1 or 2; and k, m, p, and s are each an integer of 0 or greater. This structure can further improve the antifouling properties.

The fluororesin may further contain a fluorosurfactant and/or a reactive monomer in addition to the fluorine-containing monomer. This structure can further improve the antifouling properties and the rubbing resistance.

The resin layer may contain the fluororesin of the release agent in an amount of 0.1 wt % or more and 10 wt % or less. If the fluororesin content is less than 0.1 wt %, the amount of the active component of the release agent on the surface (the surface opposite to the substrate) of the polymer layer may be too small, which may unfortunately cause poor antifouling properties. If the fluororesin content is more than 10 wt %, the amount of the active component of the release agent on the surface (the surface opposite to the substrate) of the polymer layer may be too large. This may unfortunately cause poor elasticity of the polymer layer (projections), and projections fallen by rubbing the surface (the surface opposite to the substrate) of the polymer layer may fail to rise (restore) again. As a result, the rubbing resistance may be poor.

The antifouling film may have a surface that shows a contact angle of 130° or greater with water. This structure can furthermore improve the antifouling properties.

The antifouling film may have a surface that shows a contact angle of 30° or greater with hexadecane. This structure can furthermore improve the antifouling properties.

The polymer layer may have a thickness of 5.0 µm or greater and 20.0 µm or smaller. This structure allows the active component of the antifouling agent to be distributed on the surface (the surface opposite to the substrate) of the polymer layer at a high concentration.

The pitch may be 100 nm or greater and 400 nm or smaller. This structure can sufficiently prevent occurrence of optical phenomena such as moiré and iridescence.

Each of the projections may have a height of 50 nm or greater and 600 nm or smaller. This structure allows each projection to also have a preferred aspect ratio.

Each of the projections may have an aspect ratio of 0.8 or greater and 1.5 or smaller. This structure can sufficiently prevent occurrence of optical phenomena such as moiré and iridescence, enabling good reflection characteristics. This structure can also prevent poor processability of the moth-eye structure, occurrence of sticking, and poor transferring conditions in formation of the moth-eye structure.

REFERENCE SIGNS LIST

1: antifouling film
2: substrate
3: resin solution
4: resin layer
5: die
6: polymer layer
7: projections
8: first resin
9: second resin
P: pitch
T: thickness of polymer layer
T1: thickness of first resin
T2: thickness of second resin

The invention claimed is:
1. An antifouling film comprising
a polymer layer that includes on a surface thereof an uneven structure provided with multiple projections at a pitch not longer than a wavelength of visible light,
the polymer layer being a cured product of a resin layer containing a release agent and a photo-curable resin and containing carbon atoms, nitrogen atoms, oxygen atoms, and fluorine atoms as constituent atoms, the release agent containing fluorine atoms as constituent atoms, the photo-curable resin containing nitrogen atoms as constituent atoms, fluorine atoms in the release agent being distributed on the surface of the polymer layer, the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure and of 3 atom % or less on average in a region 90 to 120 nm deep from the surface of the uneven structure, the polymer layer having a proportion of the number of the nitrogen atoms relative to the sum of the numbers of the carbon atoms, the nitrogen atoms, the oxygen atoms, and the fluorine atoms measured by X-ray photoelectron spectroscopy of 4 atom % or less on average in a region 90 to 120 nm deep from the surface of the uneven structure.

2. The antifouling film according to claim 1, wherein the photo-curable resin contains a compatible monomer that is compatible with the release agent.

3. The antifouling film according to claim 2, wherein the photo-curable resin contains the compatible monomer in an amount of 5 wt % or more and 30 wt % or less.

4. The antifouling film according to claim 2, wherein the compatible monomer includes a monofunctional monomer containing an amide group.

5. The antifouling film according to claim 1, wherein the release agent contains a fluororesin that contains a fluorine-containing monomer containing a photo-reactive group.

6. The antifouling film according to claim 5, wherein the fluorine-containing monomer is represented by the following formula (A):

$$R^{f1}\text{---}R^2\text{-}D^1 \qquad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is the photo-reactive group.

7. The antifouling film according to claim 5, wherein the fluorine-containing monomer is represented by the following formula (B) or (C):

$$CF_{n1}H_{(3-n1)}\text{---}(CF_{n2}H_{(2-n2)})_kO\text{---}(CF_{n3}H_{(2-n3)})_mO\text{---} \qquad (B)$$

$$\text{---}(CF_{n4}H_{(2-n4)})_pO\text{---}(CF_{n5}H_{(2-n5)})_sO\text{---} \qquad (C)$$

wherein n1 is an integer of 1 to 3; n2 to n5 are each 1 or 2; and k, m, p, and s are each an integer of 0 or greater.

8. The antifouling film according to claim 5, wherein the fluororesin further contains a fluorosurfactant and/or a reactive monomer in addition to the fluorine-containing monomer.

9. The antifouling film according to claim 8, wherein the reactive monomer includes an amide-containing monomer.

10. The antifouling film according to claim 5, wherein the resin layer contains the fluororesin of the release agent in an amount of 0.1 wt % or more and 10 wt % or less.

11. The antifouling film according to claim 1, wherein the antifouling film has a surface that shows a contact angle of 130° or greater with water.

12. The antifouling film according to claim 1, wherein the antifouling film has a surface that shows a contact angle of 30° or greater with hexadecane.

13. The antifouling film according to claim 1, wherein the polymer layer has a thickness of 5.0 μm or greater and 20.0 μm or smaller.

14. The antifouling film according to claim 1, wherein the pitch is 100 nm or greater and 400 nm or smaller.

15. The antifouling film according to claim 1, wherein each of the projections has a height of 50 nm or greater and 600 nm or smaller.

16. The antifouling film according to claim 1, wherein each of the projections has an aspect ratio of 0.8 or greater and 1.5 or smaller.

17. The antifouling film according to claim 1, wherein the photo-curable resin does not contain fluorine atoms as constituent atoms.

18. The antifouling film according to claim 5, wherein the fluorine-containing monomer contains one or both of the —$OCF_2$— chain and the =NCO— chain.

19. The antifouling film according to claim 1, wherein the fluorine-containing monomer includes a material having a fluoropolyether moiety.

* * * * *